Dec. 19, 1933.  W. D. DEWEND  1,940,207
OFFSET TANDEM HARROW
Filed March 1, 1929  5 Sheets-Sheet 1
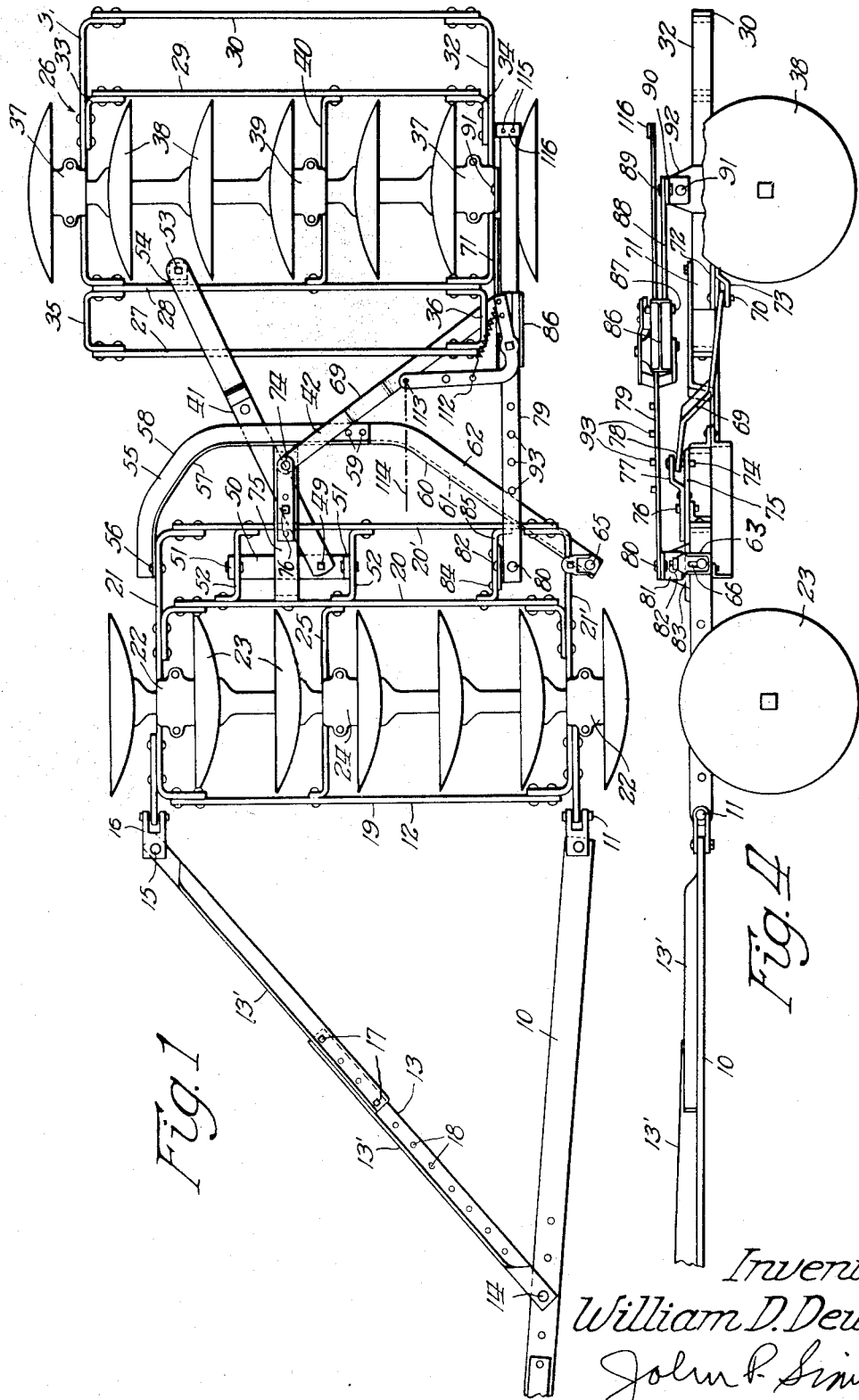

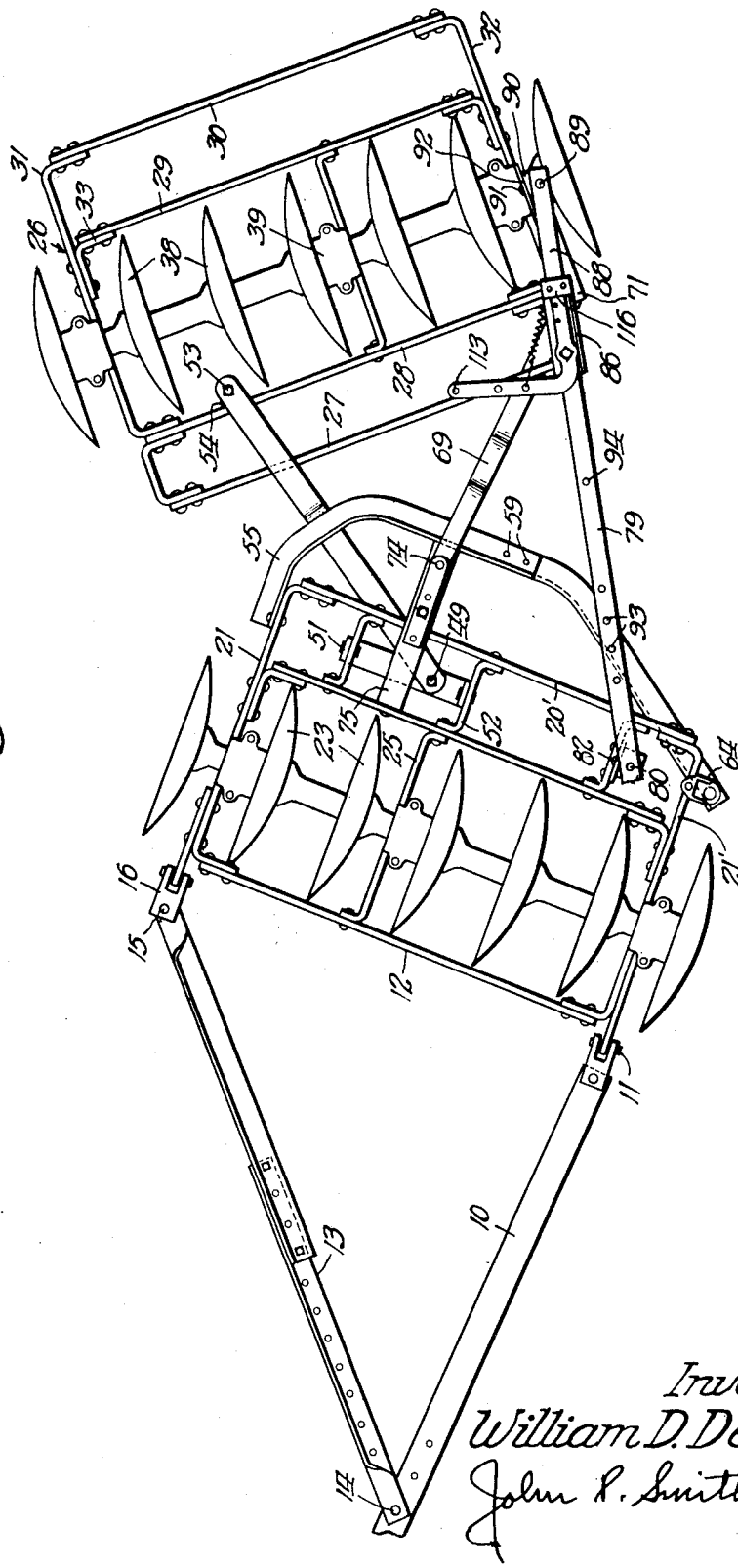

Dec. 19, 1933.  W. D. DEWEND  1,940,207
OFFSET TANDEM HARROW
Filed March 1, 1929  5 Sheets-Sheet 3
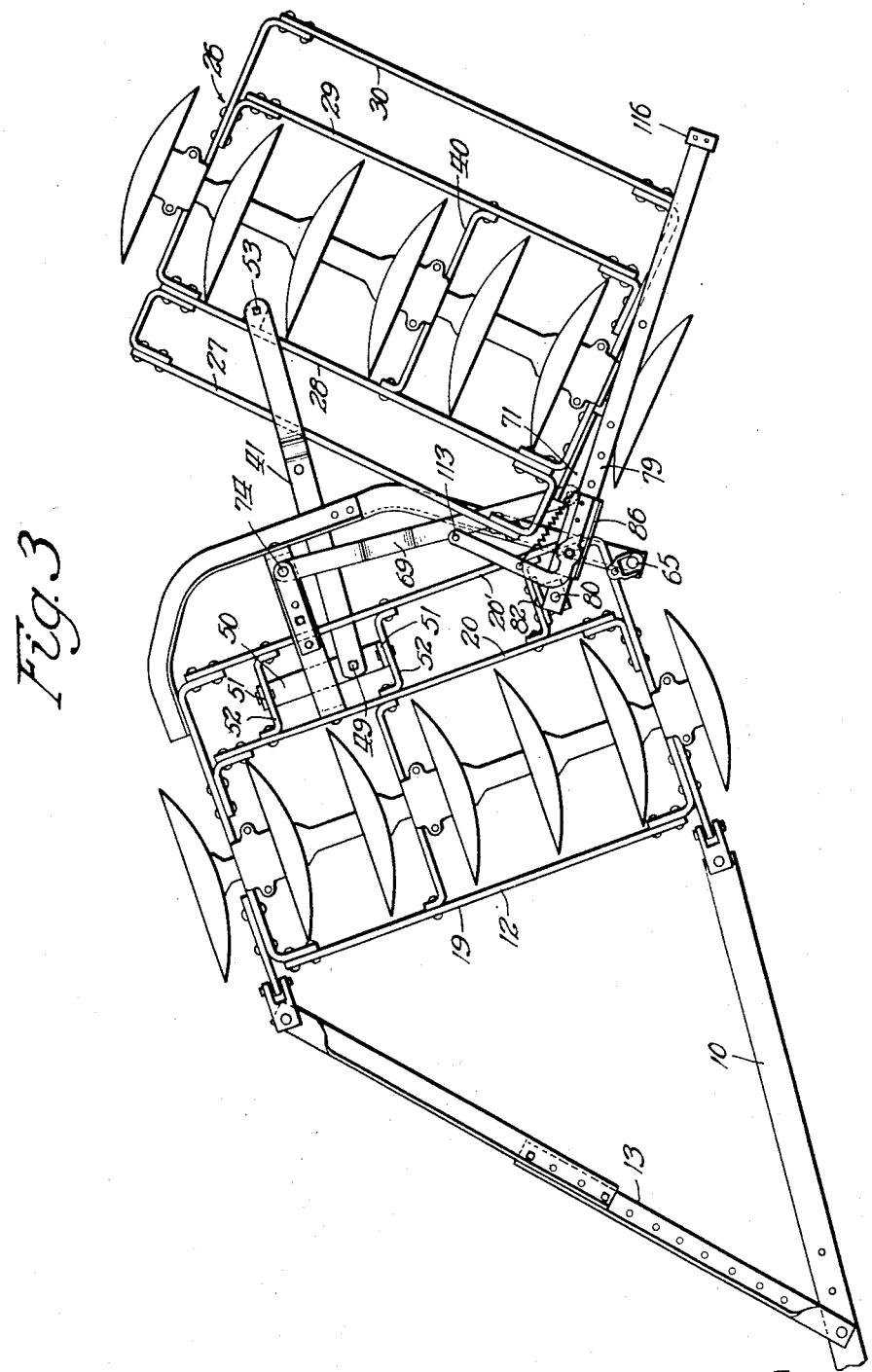

Dec. 19, 1933. W. D. DEWEND 1,940,207
OFFSET TANDEM HARROW
Filed March 1, 1929 5 Sheets-Sheet 4
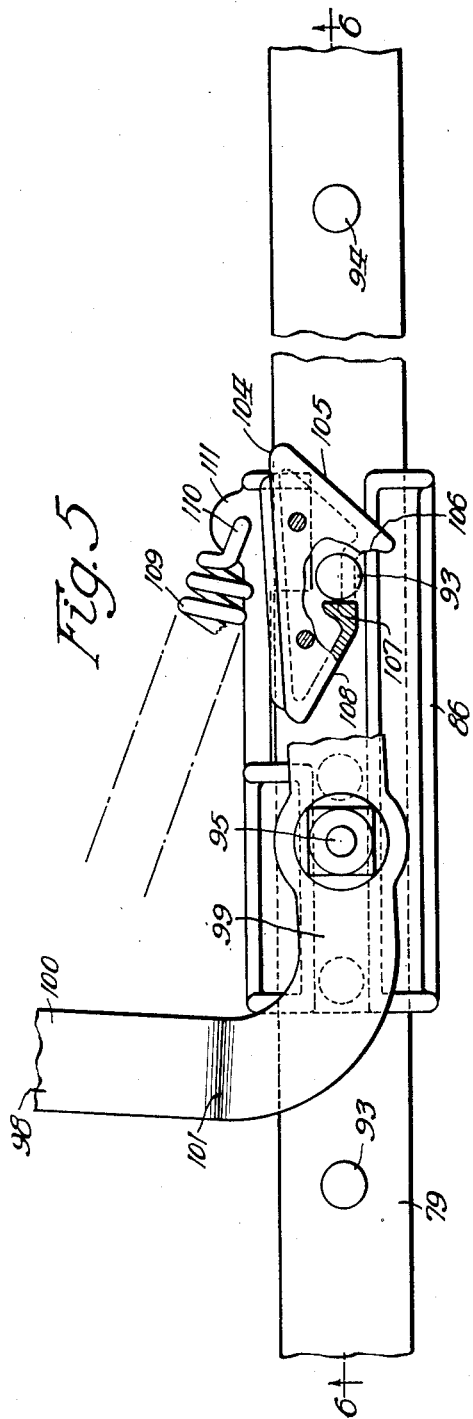
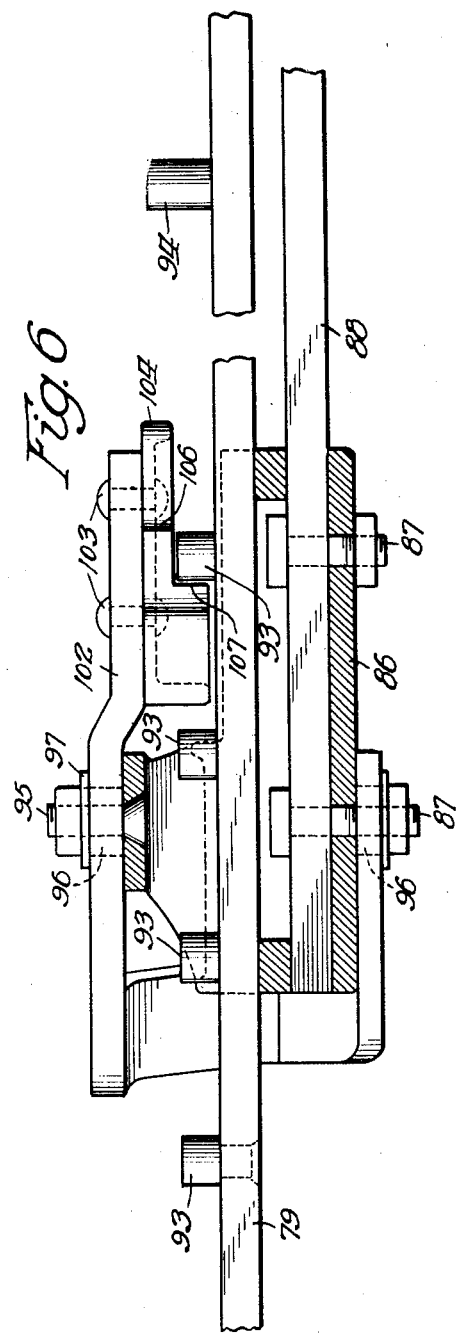
Inventor
William D. Dewend
John P. Smith
Atty.

Dec. 19, 1933.  W. D. DEWEND  1,940,207
OFFSET TANDEM HARROW
Filed March 1, 1929   5 Sheets-Sheet 5
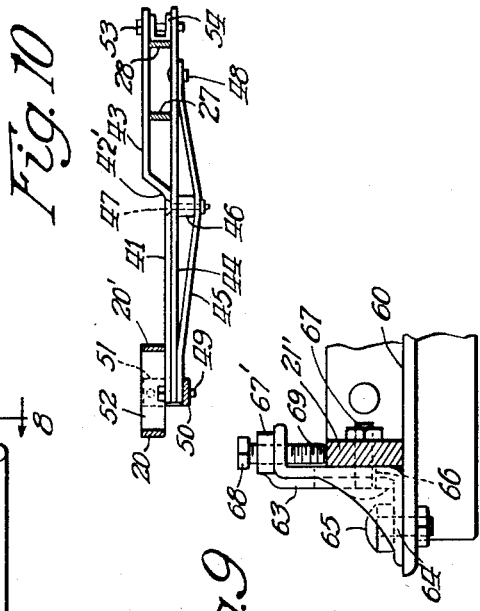
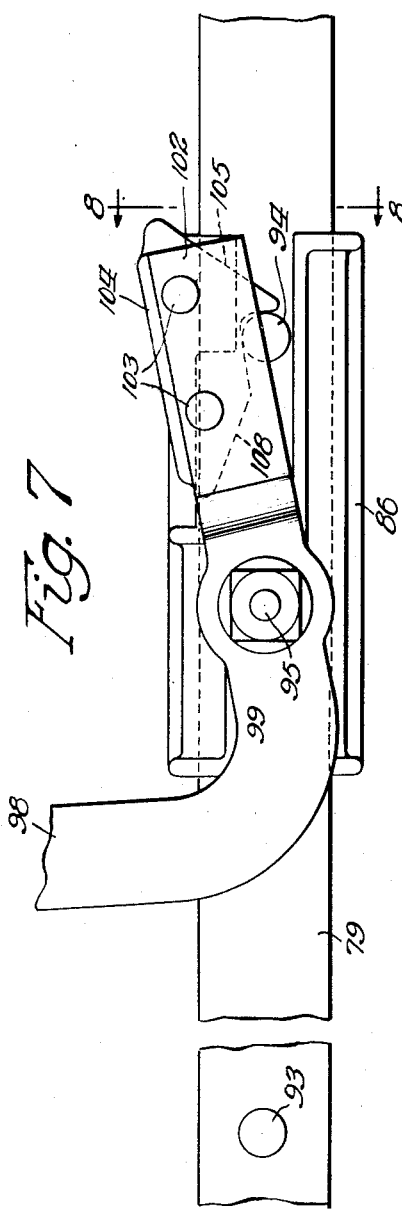
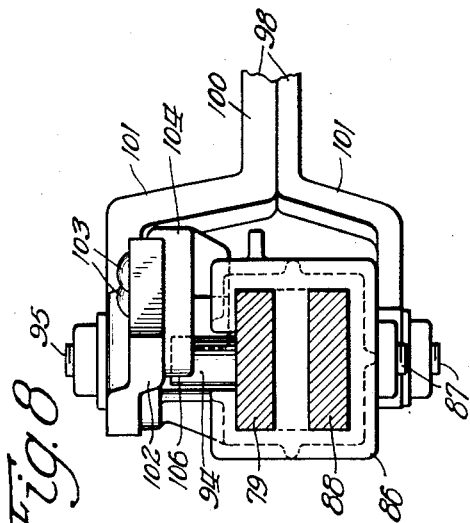
Inventor
William D. Dewend
John P. Smith Atty.

Patented Dec. 19, 1933

1,940,207

UNITED STATES PATENT OFFICE 1,940,207

OFFSET TANDEM HARROW

William D. Dewend, South Bend, Ind., assignor, by mesne assignments, to Oliver Farm Equipment Company, a corporation of Delaware Application March 1, 1929. Serial No. 343,701

15 Claims. (Cl. 55—83)

This invention relates to a tandem offset disk harrow adaptable to orchard cultivation and so designed that the harrow will travel to one side of the path of the tractor.

One of the objects of the present invention is to provide a novel and improved form of tandem offset disk harrow in which the gangs may be angled with respect to each other to their working angle by the draft of the tractor.

A further object of the invention is to provide a novel and improved form of tandem offset disk harrow in which the rear gang may be swung or angled to the left or to the right of the front gang to a working angle or to a trailing angle respectively. In permitting the rear gang to swing to the right of the front gang, the tractor and harrow may turn to make a right hand turn without any undue draft on the tractor or strain on the disks of the front or rear gangs.

A further object of the invention is to provide a novel and improved construction of a tandem offset disk harrow in which the connecting links between the front and rear ranks thereof, control the depth penetration of the disk of certain ends of the respective disk gangs.

A still further object of the invention is to provide a novel and improved form of tandem offset disk harrow in which the depth penetration of the respective ends of the front and rear gangs may be adjusted with respect to each other.

A still further object of the invention is to provide a novel and improved tandem offset disk harrow in which the forward pivots of both links forming the connection between the front gang frame and rear gang frame are located to one side of the longitudinal center of the front gang so that the rear gang will immediately assume its working angle with respect to the front gang on the rearward movement of the tractor when the locking bar is unlatched, and the rear gang will assume a trailing angle with respect to the front gang on a right turn of the tractor.

A still further object of the invention is to provide a novel and improved form of tandem offset disk harrow having a locking connection between the front and rear gang whereby the disk gangs may be locked in various angular relations with respect to each other or held in parallel alignment during the backing of the disk harrow.

A still further object of the invention is to provide a novel and improved form of tandem offset disk harrow in which the connecting links forming the connection between the front and rear gangs thereof, are so equalized, balanced and connected between the front and rear gangs that the gangs may be transported in parallel relation.

These and other objects are accomplished by providing a construction and an arrangement of the various parts in the manner hereinafter described and particularly pointed out in the appended claims.

Referring to the drawings, Fig. 1 is a top plan view of my improved form of tandem offset disk harrow showing the front and rear disk gangs in parallel position for transportation or for backing the harrow into normally inaccessible places in the field.

Fig. 2 is a top plan view of my improved form of tandem offset disk harrow showing the rear disk gang swung or angled to the right with respect to the front disk gang. In this position, the disk harrow trails very efficiently on a right hand turn of the tractor.

Fig. 3 is a top plan view of my improved tandem offset disk harrow showing the gangs thereof angled to their full working position.

Fig. 4 is a side elevational view of the tandem gang shown in Fig. 1.

Fig. 5 is an enlarged detailed top plan view partly in cross section showing the locking mechanism forming the connection between the two gangs.

Fig. 6 is a vertical cross-sectional view taken on the lines 6—6 in Fig. 5.

Fig. 7 is an enlarged fragmentary top plan view showing the locking connection engaging an elevated pin on the telescoping connecting bar which engages the pawl for locking these connections on the rearward movement of the tractor when the tractor is being backed for aligning the gangs in parallel relation as shown in Fig. 1.

Fig. 8 is an enlarged cross-sectional view taken on the lines 8—8 in Fig. 7.

Fig. 9 is an enlarged cross-sectional view showing the adjustable bracket for regulating the depth penetration of the opposite ends of each of the disk gangs with the ground, and Fig. 10 is a side elevational view showing the construction of one of the pivoted links forming one of the connections between the front and rear gang frames.

The present invention is directed to a simple and efficiently operating tandem offset disk harrow which is adaptable for orchard cultivation and is principally designed so that the harrow will travel to one side of the path of the tractor but at the same time both gangs are so connected so that they are capable of being properly trailed behind the tractor when the tractor makes a turn either to the right or left with the least amount of draft or strain on the disks of either gang. The present construction also permits the harrow to be backed with the gangs held in parallel relation into an otherwise inaccessible position in the field, such as in a corner or under trees, and immediately putting the gangs into working angle by releasing the latch and with a slightly further backward travel of the tractor to angle the gangs, thereby permitting the gangs of the harrow to assume immediate cutting effect for complete cultivation of the field.

Heretofore, tandem offset disk harrows have been constructed so that the rear gang thereof has been incapable of properly trailing the tractor when the same was turned to the right, or in other words, the trailing rear gang could not swing to the right of the forward front gang beyond a parallel position with respect to the front gang and as a result thereof, an unusual amount of draft and strain was placed upon the disks by reason of the right end of the front gang digging into the ground dragging the harrow laterally on the disks around the turn. It is therefore, one of the primary objects of the present invention to overcome this unusual strain on the harrow by permitting the rear gang of the disk harrow to properly trail the front gang on a right turn of the tractor.

In illustrating one form of my improved tandem offset disk harrow, I have shown the same as comprising a normally horizontally and vertically pivoted draft member 10 which is pivoted as shown at 11 to the front gang frame generally indicated by the reference character 12. The main draft member 10 is adjustable horizontally with respect to the front gang frame 12 by an adjustable draft connection 13 which has its forward end adjustably connected as shown at 14 to the draft member 10 and its rearward end pivotally connected at 15 to the right hand side of the front gang frame 12 by means of a pivoted bracket 16. This diagonal draft connection may be adjusted in its length by adjusting the two portions 13' which constitute this member 13 and securing them together by bolts 17 in various apertures 18 of these members. This adjustment permits the tandem harrow proper to be offset at relatively different distances from one side of the tractor. The front frame harrow comprises a forward transverse frame member 19 and two rearward transverse members 20 and 20' respectively. These transverse members 19, 20 and 20' are secured to longitudinally extending side frame members 21 and 21' in any suitable manner, but preferably by either right angle brackets or by having the end portions of the side frame members bent at right angles with respect thereto. Secured to each of the side frame members 21 and 21' are bearing boxes 22 in which is journaled a disk gang shaft (not shown) on which the usual disks 23 are journaled. The intermediate portion of the disk gang shaft is further supported on the intermediate bearing 24 which in turn is secured to an intermediate longitudinally extending frame member 25 which has its opposite ends secured to the inner sides of the rear transverse frame member 20 and the front transverse frame member 19 respectively.

The rear gang of my improved tandem offset disk harrow generally indicated by the reference character 26, comprises two forward transverse frame members 27 and 28 and two rearward transverse frame members 29 and 30. The outer ends of the two transverse members 28 and 30 are secured to side frame members 31 and 32 respectively, by having the forward and rearward ends thereof bent at right angles to the main body portion of these side frame members, as clearly shown in Fig. 1. The rearward transverse frame member 29 has its opposite end secured to the side frame members 31 and 32 by means of brackets 33 and 34. The forward transverse frame member 27 is secured to the forward transverse frame member 28 by means of substantially U shaped brackets 35 and 36. Secured to each of the side frame members 31 and 32 are bearing boxes 37 in which is journaled the disk shaft (not shown) on which are journaled the usual concave disks 38. The intermediate portion of the shaft is journaled in an intermediate bearing 39 which in turn is secured to a longitudinal bracing frame member 40 which has its forward and rearward ends secured to the forward transverse member 28 and rearward transverse member 29, respectively.

One of the essential features of the present invention involves a novel means for connecting the rear rank with the front rank so that the rear gang can swing either to the right or to the left of the longitudinal center of the front gang or may be locked in intermediate positions thereof, namely, so that the gangs are in parallel arrangement or the rear gang may be trailed to the right when the tractor is turned, or the rear gang may be angled to the left of the front gang in various angular working relations. This mechanism comprises a pair of rearwardly diverging pivoted links generally indicated by the reference characters 41 and 42. The link 41 comprises an upper flat bar 42' which has its rear end offset upwardly as shown at 43. This member 42' is secured to and is co-extensive with a flat bar 44—(see Figs. 1 and 10). The link is further braced by thrust bar 45 which has its intermediate or center portion spaced from the lower side of the flat bar 44 by a spacer block 46. This spacer block and bars 42', 44 and 45 are secured together by means of a bolt 47. The rearward end of the thrust bar 45 is secured adjacent the rear end of the flat bar 44 by means of a bolt 48. The forward end of the thrust brace bar 45 is journaled on a pivot bolt 49 which forms the common pivot for other bars forming the link 41. These three bars are pivoted to the top side of a U shaped bracket 50 which has its outer ends bent up at right angles as shown at 51, and secured to longitudinally extending brackets 52 which in turn have their front and rear ends secured to the transverse rear frame members 20 and 20' of the front gang frame. The offset portion 43 of the bar 42' extends over the tops and engages the upper edges of the transverse forward frame members 27 and 28 of the rear gang frame 26, while the lower flat bar 44 extends under and engages the lower edges of the forward transverse frame members 27 and 28 of the rear gang frame 26. These bars 42' and 44 are pivoted by means of a bolt 53 to a U shaped bracket 54 secured to the rear side of the forward transverse frame member 28.

The right hand end of the rear disk gang in its working position has a tendency to rise out of the ground while the right hand end of the front disk gang has a tendency to penetrate the ground deeper on account of the side of the convex disk more aggressively engaging the ground. To overcome this tendency, I have provided a curved angle iron or guide member 55 which is secured to the right side of the side frame member 21 of the front gang frame 12 by means of a bolt or rivet 56. This angle member has one flange thereof forming its sides extending vertically upward as shown at 57, and the other flange thereof, as shown at 58, extending horizontally so as to present a flat under surface to the top side of the bar 42' for overcoming the tendency to raise the right hand end of the rear gang up and preventing the right hand end of the front gang from penetrating too deeply. Secured to the inner end of the transversely extending portion of the guide member 55 by means of bolts 59 is an angularly disposed guide extension member 60 which is preferably made of angle iron and has one flange thereof as shown at 61 extending vertically downwardly and the other flange thereof, as shown at 62, extending horizontally so as to form a guide for the link 42 hereinafter described. The outer end of the guide member 60 is adjustably secured to the left side frame member 21' of the front gang frame 12 by means of adjustable bracket 63. The adjustable bracket is provided with a horizontally extending flange 64 which is adapted to receive a bolt 65 for securing the outer end of the guide member 60 thereto. Extending vertically in the adjustable bracket 63 is a slot 66 through which a bolt 67 extends for adjustably securing the bracket 63 to the side frame member 21' of the front gang frame 12— (see Figs. 4 and 9). Formed integrally with the bracket and extending inwardly therefrom, is an apertured boss 67' in which is mounted in threaded engagement therewith a set screw 68 which is adapted to have its lower end, as shown at 69, engage the upper edge of the side frame member 21' of the front gang frame 12. From this construction, it will be noted that when the bolt 67 is loosened, the set screw 68 may be adjusted for raising or lowering the bracket and thereby raising or lowering the guide member to various positions of adjustment after which the bolt 67 may then be tightened for retaining the guide member in the proper adjusted position. By adjusting the guide members 55 and 60 through the above described mechanism, the relative depth penetration of the opposite ends of the disk harrow may be controlled or adjusted through the medium of the links 41 and 42 engaging these guide frame members.

The other link 42 consists of a single bar and is provided intermediate its end with an offset or downwardly disposed portion 69 with the rearwardly end portion thereof extending parallel with the forward portion thereof. The rearward end of the link 42 is pivoted by means of a pin or bolt 70 mounted in an angle iron or bracket 71 secured to the forward portion of the side frame member 32 of the rear gang frame 26. Secured to the horizontal flange 72 of the angle bracket 71 is an offset bar or bracket 73 forming a recess therebetween for the reception of the rear pivotal end of the link 42—(see Fig. 4). The pin or bolt 70 extends through apertures in the flange 72 and brackets 73 for pivotally supporting the rear end of the link 42. The horizontal rear portion of the link 42 engages the under edge of the transverse forward frame member 27 and U shaped bracket 36 of the rear gang frame member 26 to prevent excessive penetration of the disk of the left hand side of the rear gang into the ground. The forward end of the link is pivoted as shown at 74 to the front gang frame 12 at a position to the right side of the longitudinal center of the gang. This pivotal connection is formed by a substantially inverted U shaped bracket 75 which has its opposite ends bent at right angles with the main body portion thereof and secured at its forward end to the transverse frame member 20 of the front gang frame 12 and its rearward end secured to the upwardly extending flange 57 of the guide member 55. Secured to the top surface of the bracket 75 by means of bolts 76 is a second offset bracket bar 77 forming a space between it and the inverted U shaped bracket 75 in which the forward end 78 of the link 42 is pivotally connected by means of the pin 74. It will be noted that the forward portion of the link 42 is positioned above the guide frame members 55 and 60 so that the same is adapted to engage the upper surface of these members during the pivotal action to the right or to the left of the rear gang with respect to the front gang, and the angularly disposed beveled portion 69 of the link 42 will properly guide this link over the guide member 60, as clearly shown in Fig. 3, so as to hold the left hand end of the disk gang from too deep penetration in the ground and at the same time hold the disks of the left hand end of the front gang into proper penetration with the ground.

From the above description, it will be seen that by having the forward pivotal connections 49 and 74 of the respective links 41 and 42 with the front gang frame on the right hand side of the longitudinal center of the front gang frame that on the initial right hand turning movement of the harrow by the draft of turning the tractor, the gangs will immediately and automatically assume a trailing position or a position in which the rear gang is swung to the right of the front gang so that the draft strain on the disk blades is entirely eliminated, as shown in Fig. 2. When it is desirous to angle the gangs to their working position or the position shown in Fig. 3, or in fact, to any intermediate working angle, the tractor is backed and by reason of the pivotal connections of these links being on the right hand side of the longitudinal center of the front gangs, the gangs will immediately assume a working angle in which position they may be locked by the mechanism hereinafter described.

Another essential feature of my improved tandem offset disk harrow includes the mechanism for locking the front and rear gangs in different angular working relation and also, to permit the disk gangs to be held in parallelism during backing, and also permitting the gang to swing to the right of the front gang so that the rear gang can properly trail the front gang in a right hand turn of the tractor without any undue strain on any of the disks of either gang. This locking mechanism comprises a longitudinally extending bar 79 which has its forward end, as shown at 80, pivoted to an angle bracket 81, which in turn is pivoted on a horizontal pivot 82 to a plate 83. The plate 83 is secured by means of rivets 84 to a longitudinally extending bracket 85, which in turn has its forward and rearward ends secured respectively, to the transverse frame members 20 and 20' of the front frame gang 12. By referring to Fig. 4, it will be noted that the pivoted angle bracket 81 is elevated to a position somewhat above the frame structure so as to allow clearance for the locking bar and sliding block when the gangs are angled to various angular positions. The locking bar 79 is slidably mounted in a block 86 which in turn is secured by means of bolts 87 to a horizontal bar 88. The bar 88 is pivoted as shown at 89 to an angle bracket 90, which in turn is pivotally secured on a horizontal pin 91 on a plate 92 secured to the side frame member 32 of the rear gang frame 26. The sliding bar 79 is provided with a plurality of spaced apart, upwardly extending short pins 93 which are located in the longitudinal center of the bar and are adapted to be engaged by a spring actuated pawl hereinafter described—(see Figs. 5, 6, 7 and 8). These short pins are preferably located along the forward portion of the bar 79. Located just rearwardly of the longitudinal center of the bar 79 is a relatively higher pin 94 which is adapted to engage a certain portion of the pawl hereinafter described, but which is not capable of engaging the shorter pins 93. Pivoted by means of bolts 87 and 95 on the opposite side of the block 86, through the medium of the usual bearing washers 96, and common washers 97, is a bell-crank lever 98. This lever is preferably made of two flat members which have one portion thereof, as shown at 99, at right angles with respect to the other portion 100. The arms 99 are preferably offset as shown at 101 so as to be pivoted on the opposite sides of the block 86 by means of bolts 87 and 95 hereinbefore referred to,—(see Figs. 6 and 5). Secured to a downwardly offset portion 102 of the upper arm 99 of the lever 98 by means of rivets 103 is a pin engaging pawl generally indicated by the reference character 104. This pawl is provided with a beveled or inclined rear portion 105 which is elevated or located to travel in a path above the short pins 93 but is adapted to engage the elevated pin 94 and swing the pawl 104 and lever 98 about its pivots on the bolts 87 and 95 when the locking bar 79 moves forwardly with respect to the block 87. The pawl 104 is provided with a hook portion 106 at the termination of the beveled edge 105, which is adapted to engage the elevated pin 94 on the rearward movement of the bar 79 with respect to the block 86—(see Fig. 7). It will also be noted that this hook portion 106 of the pawl 104 is elevated or travels in a path above the short pins 93 and is ineffective to engage these shorter pins. The pawl 104 is provided with a downwardly projecting stop or lock 107 which is located in the path of the shorter pins 93 and is adapted to be engaged thereby. The forward portion of the pawl 104 is beveled as shown at 108, and is movable in the path of the shorter pins 93 so that on a rearward movement of the bar 79 with respect to the pawl 104, the shorter pins will engage this forward beveled portion 108 to move the pawl outwardly to the next succeeding pin. The pawl is urged into engagement with these pins by a spring 109 which has its rearward end as shown at 110, secured to an ear 111 formed on the right side of the block 86. The other end of the spring, as shown at 112, is secured to the right angularly and transversely extending arm 100 of the lever 98. The free end of the lever 98, as shown at 113 is connected by a rope 114 to the operator's seat on the tractor, from where the operation of the lock may be manipulated. Secured to the rear end of the bar 79 by means of rivets 115 is a plate 116 which provides a stop for engaging the rear end of the block 86 for preventing the bar from entirely withdrawing from the block and to limit the angling movement of the rear gang to the right of the front gang in turning the tractor to the right.

The operation of my improved tandem disk harrow is as follows: Let us assume that the disk gangs are in their parallel position or the position shown in Fig. 1, and that the operator is desirous of throwing the gangs into working angle or the position shown in Fig. 3, or any intermediate working angle within the range of the short pins 93, the rope 114 is pulled forward from the operator's seat on the tractor when the tractor is backed, and on account of the pivots 49 and 74 of the respective links 41 and 42, being on the right side of the longitudinal center of the front gang frame, the right end of the rear gang is thrown rearwardly and the left hand side of the front gang is moved rearwardly, causing the axes of the two gangs to converge on the left hand side or assume the position shown in Fig. 3. During this movement the locking bar 79 slides through the block 86 and when the tension on the rope or cord 114 is released, the spring 109 actuates the arm 99 of the lever 98 in a clockwise direction (when looking at Fig. 5), so that the pawl 104 and particularly the stop 107 thereof, engages one of the short pins 93 on the bar 79, locking the gangs in their working angle, as shown in Fig. 3. When the gangs assume their working angular position as shown in Fig. 3, it will be noted that the disks on the left end of the rear gangs are prevented from penetrating the ground too deeply by reason of the left forward end of the rear gang frame riding or sliding on the upper surface of the link 42 and by the further reason of this link riding on the top surface of the guide angle 60. It will be further noted that the disks on the left hand end of the front gang are held depressed to proper penetration of the ground by reason of the link 42 engaging the top surface of the guide member 60. While the right hand end, or particularly the disks on the right hand end of the rear frame are held to proper depth penetration of the ground by reason of the link 41 engaging the top edge of the frame members 27 and 28 of the rear gang frame 26, while the disks on the right hand end of the front gang are held from excessive depth penetration by the forward end of the link 41 engaging the under side of the guide member 55 and frame member 20' of the front gang frame.

If the operator is desirous of straightening the gangs, or have them assume their parallel relationship from the position shown in Fig. 2, to that shown in Fig. 1, the pawl 104 is disengaged from the short pins 93 by pulling on the rope 114 and by a forward movement of the tractor, the locking bar 79 slides freely through the block 86 and on account of the forward pivots of the respective links 41 and 42 being located on the right side of the longitudinal center of the front gang frame, the gangs assume a parallel relationship.

If the operator is desirous of backing the tractor into an otherwise inaccessible place in the field, the gangs may be backed in parallel relation or in a position shown in Fig. 1, by having the elevated pin 94 on the bar 79 engage the hook 106 of the pawl 104, as clearly shown in Fig. 7, and when the harrow is properly backed to the otherwise inaccessible position in the field, the pawl 104 may be released from the elevated pin 94 by pulling the rope and on a slightly further backward travel of the tractor, the gangs are then again thrown into working angle and are prepared to take immediate cutting effect to complete the cultivation of the field.

If the operator is desirous of making a right hand turn with the tractor from any working angle position, the same may be taken by releasing the pawl 104 from the pins 93 through the medium of the rope 114 and upon turning to the right, the locking bar 79 will slide through the block 86 to a point in which the stop 116 on the rear end of the bar 79 engages the rearward edge of the block 86 in which the gangs assume the position shown in Fig. 2. This permits the gangs to make a right turn without any excessive draft strain on any of the disks of the gangs and permits the tandem disk harrow to trail in the path of the tractor.

The links connecting the front and rear gangs are so balanced that they may be transported across the field in a straight direction without the necessity of any locking arrangement for this purpose.

While in the above specification I have described one embodiment which my invention may assume in practice, it is, of course, understood that the same is capable of modification, and that modification may be employed without departing from the spirit and scope of my invention, as expressed in the following claims.

What I claim as my invention and desire to secure by Letters Patent is:

1. A tandem disk harrow comprising a front frame and a rear frame, disk gangs mounted in each of said frames, non-parallel links for pivotally connecting said frames together, said links being pivotally connected to the front frame on one side of the longitudinal center of said front frame and means located on one side of said frames for locking said gangs in various angular relation with respect to each other.

2. A tandem offset disk harrow comprising a front frame and a rear frame, disk gangs mounted in each of said frames, means for changing the angular relation of said gangs including a plurality of links pivoted at their forward and rearward ends to the front and rear gangs respectively, said links diverging and having their rear ends pivoted on opposite sides of the longitudinal center of the rear gang and their forward ends pivoted on one side of the longitudinal center of the forward gang, and means for locking said gangs in various angular relation with respect to each other.

3. A tandem offset disk harrow comprising a front frame and a rear frame, disk gangs mounted in each of said frames, means for changing the angular relation of said gangs including a plurality of links pivoted at their forward and rearward ends to the front and rear frames respectively, said links being pivoted on one side of the longitudinal center of the front gang and diverging rearwardly with the rear ends thereof pivoted on opposite sides of the longitudinal center of the rear gang and means located on one side of said frames for locking said gangs in various angular relation with respect to each other.

4. A tandem offset disk harrow comprising a front frame and a rear frame, disk gangs mounted in each of said frames, means for angling said gangs including a plurality of links pivoted at their forward and rearward ends to the front and rear frames respectively, said links diverging and having their forward ends thereof pivoted on one side of the longitudinal center of the front gang and their rear ends being located on opposite sides of the longitudinal center of the rear gang and means forming a connection between said frames and located on one side of the longitudinal center thereof for locking said gangs in various angular relation with respect to each other.

5. A tandem offset disk harrow comprising a front frame and a rear frame, disk gangs mounted in each of said frames, means including a plurality of links pivoted at their forward and rearward ends to the front and rear frames respectively, said links diverging rearwardly, the forward pivots of said links being located on one side of the longitudinal center of the front gang and the pivots of the rear ends of said links being located on opposite sides of the longitudinal center of the rear gang and means including the adjacent portion of both gang frames for controlling the depth penetration of the opposite ends of the respective front and rear gangs by said links.

6. A tandem offset disk harrow comprising a front frame and a rear frame, disk gangs mounted in each of said frames, means for pivotally connecting said frames together, said means being pivotally connected to the front frame on one side of the longitudinal center of said front frame, means for locking said gangs in various angular relation with respect to each other and means including guide members carried by each of said frames and engageable with said first named means whereby the depth penetration into the ground of the opposite ends of the front and rear disk gangs is controlled.

7. A tandem offset disk harrow comprising a front frame and a rear frame, disk gangs mounted in each of said frames, means for pivotally connecting said frames together, said means being pivotally connected to said front frame on one side of the longitudinal center of said front frame, means for locking said gangs in various angular relation with respect to each other and guides carried by said frames and engageable with said first named means for controlling the depth penetration of the disks on the opposite ends of the front and rear gangs and means for adjusting one of said guides whereby the depth penetration of the disks on the opposite ends of the front and rear disk gangs may be regulated.

8. A tandem offset disk harrow comprising a front frame unit, a rear frame unit, and substantially cross connecting links pivotally connecting the front unit with the rear unit, the forward pivots of said links with the front unit being located on one side of the longitudinal center of the front frame unit and the rearward pivots of said links with the rear unit being located on opposite sides of the longitudinal center of the rear unit, whereby on the rearward movement of the harrow the gangs may automatically assume a working angle and on a right hand turn of the harrow the rear unit will properly trail the front unit.

9. A tandem offset disk harrow comprising a front frame and a rear frame, disk gangs mounted in each of said frames, links pivotally connecting said gangs together, the pivotal connection of said links with said front frame being located at different distances from and on one side of the longitudinal center of the front frame, the rear pivots of said links with the rear frame being located at different distances from the longitudinal center of the rear frame, and means for locking said gangs in various angular working relation with respect to each other.

10. A tandem offset disk harrow comprising a front frame and a rear frame, disk gangs mounted in each of said frames, means including a plurality of normally cross links for pivotally connecting said gangs together, the forward pivots of said links being located at different distances from and on one side of the longitudinal center of the front frame, the rearward pivots of said links being at different distances from the longitudinal center of the rear frame, a locking bar pivotally related to the front frame, a locking mechanism pivotally related to the rear frame and operatively connected to said locking bar, and means for operating said locking mechanism whereby said gangs may be locked in various angular working positions.

11. A tandem offset disk harrow comprising a front frame and a rear frame, disk gangs mounted in each of said frames, links pivotally connecting said front frame to said rear frame, a locking mechanism located at one side of both frames, including a locking bar pivoted to said front frame and extending in a direction rearwardly towards said rear frame, locking means pivoted to said rear frame and operatively related to said locking bar, said locking means comprising a spring actuated pawl, and means including pins of different heights secured to said locking bar and engageable with different portions of said pawl for locking said gangs in angular relation with respect to each other, and for permitting said harrow to be backed with the gangs in parallel relation with respect to each other.

12. A tandem offset disk harrow comprising a front frame and a rear frame, disk gangs mounted in each of said frames, links pivotally connecting said front frame to said rear frame, a locking mechanism located at one side of both frames including a locking bar pivoted to said front frame and extending in a direction rearwardly towards said rear frame, locking means pivoted to said rear frame and operatively related to said locking bar, said locking means comprising a spring actuated pawl, and means including a plurality of pins, one of which is of a different height than the other of said pins for engaging a certain portion of said pawl whereby said gangs may be backed in parallel relation with respect to each other.

13. A tandem offset disk harrow comprising a front frame and a rear frame, disk gangs mounted in each of said frames, means including a plurality of links pivoted at their forward and rearward ends to the front and rear frames respectively, said links having straight lines passing through the respective pivots of each of these links intersecting, the forward pivots of said links being located at different distances from and on one side of the longitudinal center of the front frame, the pivots of the rear ends of said links being located on opposite sides of the longitudinal center of the rear frame, means for locking said frames in various angular relation with respect to each other, including a locking bar pivoted to the front frame and extending rearwardly toward the rear frame, a sleeve pivoted to the rear frame and adapted to slidingly engage said locking bar, and a pawl pivoted to said sleeve and engageable to lock said bar in various adjusted positions to said sleeve, whereby said gangs may be locked in various angular relation with respect to each other.

14. A tandem offset disk harrow comprising a front frame and a rear frame, disk gangs mounted on each of said frames, means including a plurality of links pivoted on their forward and rearward ends to the front and rear frames respectively, the forward pivots of said links with said front frame being located on one side of the longitudinal center of the front frame, the rearward pivots of said links being located on the opposite sides of the longitudinal center of the rear frame, a locking mechanism including a locking bar pivoted to said front frame and extending rearwardly in the direction of the rear frame, a sleeve pivoted to the rear frame and slidably connected to said locking bar, and a stop secured to said locking bar and engageable with said sleeve for limiting the angular trailing movement of said rear gang with respect to said front gang.

15. A tandem offset disk harrow comprising a front frame and a rear frame, disk gangs mounted on each of said frames, means including a plurality of links pivoted on their forward and rearward ends to the front and rear frames respectively, the forward pivots of said links with said front frame being located on one side of the longitudinal center of the front frame, the rearward pivots of said links being located on the opposite sides of the longitudinal center of the rear frame, a locking mechanism including a locking bar pivoted to said front frame and extending rearwardly in the direction of the rear frame, a sleeve pivoted to the rear frame and slidably connected to said locking bar, a lever pivoted to said sleeve and adapted to be actuated from the operator's seat on the tractor, a pawl carried by said lever, spaced apart pins secured to said locking bar and engageable with said pawl for locking said gangs in various angular relation, and a stop secured to the rear end of said locking bar and engageable with said sleeve for limiting the trailing angle of said rear gang with respect to said front gang on a right hand turn of the tractor.

WILLIAM D. DEWEND.